US008882403B2

(12) United States Patent
Hobohm

(10) Patent No.: US 8,882,403 B2
(45) Date of Patent: Nov. 11, 2014

(54) CUTTING INSERT CARRIER

(75) Inventor: Uwe Hobohm, Wendelstein (DE)

(73) Assignee: Kennametal Inc., Latrobe, PA (US)

( * ) Notice: Subject to any disclaimer, the term of this patent is extended or adjusted under 35 U.S.C. 154(b) by 316 days.

(21) Appl. No.: 13/444,075

(22) Filed: Apr. 11, 2012

(65) Prior Publication Data

US 2012/0263547 A1   Oct. 18, 2012

(30) Foreign Application Priority Data

Apr. 13, 2011   (DE) .......................... 10 2011 016 921

(51) Int. Cl.
   *B23C 5/22*   (2006.01)
   *B23C 5/06*   (2006.01)

(52) U.S. Cl.
   CPC ................. *B23C 5/2295* (2013.01); *B23C 5/06* (2013.01); *B23C 2260/12* (2013.01); *B23C 5/2243* (2013.01)
   USPC .............................................. 407/35; 407/40

(58) Field of Classification Search
   CPC .. B23C 5/2234; B23C 5/2239; B23C 5/2243; B23C 5/226; B23C 5/2295
   USPC .................... 407/35, 40, 41, 47, 49
   See application file for complete search history.

(56) References Cited

U.S. PATENT DOCUMENTS 5,059,068 A * 10/1991  Scott ................................. 407/9
6,604,894 B1 *  8/2003  Noggle .......................... 407/35
7,600,951 B2 * 10/2009  Van Horssen ................... 407/70

FOREIGN PATENT DOCUMENTS

JP         55011729 A  *  1/1980
JP         08039331 A  *  2/1996
JP        2005014114 A  *  1/2005
JP        2009220222 A  * 10/2009

OTHER PUBLICATIONS

English abstract of JP 55011729A.*

* cited by examiner

*Primary Examiner* — Daniel Howell
*Assistant Examiner* — Nicole N Ramos
(74) *Attorney, Agent, or Firm* — Larry R. Meenan, Esq.

(57) ABSTRACT

The cutting insert carrier, in particular for a face milling cutter (2) comprises a tool basic body (4), having a multiplicity of insert seats (5), in which cutting inserts (6) are received. Rotatably fastened to the tool basic body (4) is a setting element, which is realized, in particular, as a curved ring (8) and which has circumferential cams (10), by means of which the clamping levers (12) are actuated for the purpose of fastening the cutting inserts (6) in a locking manner. The setting element (8) enables all clamping levers (12) to be actuated jointly, at the same time, such that all cutting inserts (6) are simultaneously released or locked in their insert seats (5). As a result, the assembly and setup time for insert changing is reduced significantly in comparison with conventional systems.

16 Claims, 2 Drawing Sheets

CUTTING INSERT CARRIER

CLAIM TO PRIORITY

This application is a National entry application of German Application No. 102011016921.0, filed Apr. 13, 2011, the entire contents of which is incorporated herein by reference.

BACKGROUND OF THE INVENTION

1. Field of the Invention

The invention relates to a cutting insert carrier, also termed a blade head, in particular for a face milling cutter, comprising a tool basic body, which has a plurality of insert seats, in particular distributed around the circumference thereof, for receiving cutting inserts for workpiece machining.

2. Description of Related Art

It is necessary for the cutting insert carrier to be regularly fitted with the cutting inserts, in particular indexable cutting inserts, which become worn during workpiece machining and which therefore must be exchanged. The individual indexable cutting inserts in this case must be aligned in a defined position in their insert seats, such that the cutting edges of the individual cutting inserts lie on a common circumferential line or in a common machining plane. Owing to the large number of cutting inserts, exchanging the cutting inserts in the case of such a tool is usually very time-consuming, since each cutting insert has to be fastened individually into the respective insert seat by means of a respective clamping element, for example by means of a clamping claw or clamping screw. In addition, frequently, further setting elements are provided for fine adjustment.

For example, in this case the cutting insert carrier has more than about ten cutting inserts. Such cutting insert carriers typically have diameters that, depending on the field of application, start at about 50 mm to 60 mm and go up to about 250 mm. For special applications, the diameters can also be considerably greater than these and can be, for example, up to 2 m.

SUMMARY OF THE INVENTION

Proceeding from this, the invention is based on the object of specifying a cutting insert carrier wherein exchanging the cutting inserts is simplified.

The object is achieved, according to the invention, by a cutting insert carrier (blade head), in particular for a face milling cutter, having the features of claim 1. The cutting insert carrier has a tool basic body that comprises a multiplicity of insert seats for receiving cutting inserts. Furthermore, a common setting element is provided on the tool basic body, there being assigned to the setting element, for a multiplicity of insert seats, preferably for all insert seats, a respective clamping element realized for clamping a respective cutting insert in the respective insert seat in a reversibly releasable manner. A majority of clamping elements, preferably all clamping elements, can be actuated jointly by means of the setting element. Merely one actuation of the setting element results in all clamping elements being actuated simultaneously and jointly in order, optionally, to fasten or release the cutting inserts.

In comparison with the previous cutting insert carriers/blade heads, this concept of the common setting element for all clamping elements therefore significantly reduces and simplifies the amount of fitting required and, consequently, the setup time, i.e. the time required to prepare the tool for use. It is no longer necessary for each separate insert seat to be fastened individually.

For this purpose it is provided, in an expedient design, that the setting element is mounted on the tool basic body so as to be adjustable relative to the latter, and the clamping elements are actuated by a relative movement in respect of the tool basic body. The tool basic body and the setting element therefore constitute two elements that are mounted on one another and that constitute a common structural unit. In particular, the setting element is rotatably mounted on the tool basic body, the rotation axis being simultaneously the rotation axis of the tool when in operation.

For the purpose of jointly actuating the clamping elements, the latter are guided in a constrained manner by means of the setting element. As a result of this constrained guidance, an adjustment movement of the setting element results in an adjustment of the clamping elements, i.e. upon actuation in the clamping direction, the clamping elements are pressed against the cutting inserts and the latter are thereby locked in the insert seat. Conversely, for the purpose of releasing the clamping elements, upon a corresponding adjustment movement of the setting element, in particular in the opposite direction, the respective clamping element is brought forcibly out of its clamping or locking position into an open position, such that the cutting insert is freed and can be taken out of the insert seat, or falls out of the latter.

The clamping elements in this case are preferably realized as a clamping lever having a first lever arm that acts upon the respective cutting insert. Preferably, in this case, the clamping lever is rotatably mounted on the tool basic body. An actuation by means of the setting element therefore results in a movement, in particular a rotational movement. Appropriate design of the clamping lever makes it possible to achieve sufficiently high clamping forces/locking forces to ensure that the cutting inserts are reliably fastened in the insert seat.

In a preferred design, the clamping lever in this case is realized in the manner of an articulated arm lever, having a second lever arm that is guided in a constrained manner on the setting element. An articulated arm lever in this case is understood to be a clamping lever whose two lever arms are disposed at an angle in relation to one another. Preferably, in this case, the rotatable fastening to the tool basic body is effected in the articulation region.

According to a preferred development, the setting element furthermore serves to define a latching position, in which the clamping elements are held in their desired clamping position. In this case, this latching position is clearly identifiable by the person performing the setting operation during the setting process, for example by means of a tactile or acoustic indication upon latching into this latching position.

Expediently in this case, a dedicated latching position is defined for each individual clamping element. As a result, each individual clamping element is held in the defined desired clamping position. The person performing the setting can also identify whether each individual clamping element is actually in the desired position.

In order to realize these latching positions, in an expedient design the setting element in this case has latching hollows, in which the clamping elements lie, by means of a foot, when they attain the desired clamping position.

Since, during workpiece machining, the cutting inserts must lie with their cutting edges on a common circumferential line or within a common plane, it is necessary for the cutting inserts to be positioned in a highly precise manner in the insert seats. On the one hand, this requires that the insert seats be designed to the highest possible precision. Usually, these insert seats define a supporting surface or base surface, on which the cutting inserts are supported via one of their insert base sides. At the same time, the insert seat additionally defines a lateral bearing surface, and preferably a plurality of lateral bearing surfaces, usually two, on which the cutting insert bears via front faces. The cutting inserts are usually shaped plate-type bodies of differing cross-sectional geometries, in which two base sides or flat sides are connected to one another via the front faces. The cutting edges are usually defined by the edges between front faces and flat sides. The indexable cutting inserts are often of a triangular, square, hexagonal or, also, an octagonal design.

In order to ensure alignment with the greatest possible precision, despite all cutting inserts being clamped simultaneously and jointly, it is provided in a preferred design that the respective clamping element has a clamping head that, when in the clamping position, acts together with the indexable cutting insert, in particular is clamped against a flat side thereof, being so clamped in such a way that the cutting insert is automatically pressed into a predefined desired position. For this purpose, the clamping head has inclined surfaces, such that, during clamping, it is not only an orthogonal force component, in the direction of the supporting surface, but also a force component, radial in relation thereto, in the direction of the lateral bearing surfaces of the insert seat, that is exerted upon the cutting insert. In particular, for this purpose the clamping head is realized in the form of a cone, ball or cup. Corresponding thereto, the respective cutting insert has a receiver, centric in relation thereto, in the manner of a recess, for example in the form of a hollow or cup.

In respect of the constrained guidance of the clamping elements by means of the setting element, for each clamping element the latter has a path guide, in particular a curved path, or defines such a path guide, along which the clamping element is guided in a constrained manner. In particular, for this purpose the setting element has a corresponding contouring, the clamping element being guided, via its foot region, along this contour.

Therefore, since the clamping elements are fixed to the tool basic body, an adjustment movement of the setting element effects a relative movement between the setting element and the clamping elements, such that the foot of the clamping lever slides along the path guide.

According to a first embodiment variant, it is provided that the setting element is realized in the manner of a curved or cam ring or disk that has cams on its circumferential side. On its circumferential side, the cam ring has recesses and convexities, which constitute the curved path for the clamping elements. A cam, having an associated cavity, is provided for each clamping element in this case. Preferably in this case, the cams are realized so as to be identical for each clamping element.

According to an advantageous second variant, the setting element is realized as a slotted setting ring, i.e. the respective clamping element is guided in a slot realized in the setting element.

The setting element, in particular the cam ring, is preferably rotatably fastened at a front face on the tool basic body, whereas, in an alternative design, the setting element, in particular the slotted setting ring, is disposed circumferentially. The setting ring in this case is preferably slotted on its inner circumferential surface. The slots in this case preferably extend, at least in partial regions, obliquely in relation to a tool longitudinal direction that is defined by a rotation axis of the tool.

For the purpose of fastening the setting element to the tool basic body, fastening elements are provided, which are preferably routed through elongate holes in the setting element. The fastening in this case is effected in such a way that a rotational movement, or relative movement of the setting element in relation to the tool basic body, is still possible with a defined expenditure of force.

For the purpose of adjusting the setting element, in an expedient design adjusting elements are provided, in particular in the form of adjusting screws. Generally, the setting element has application surfaces for such an adjusting tool or adjusting element. In principle, it is possible for the setting element to be actuated, for example, by means of an appropriately realized tool key that engages releasably in corresponding key receivers of the setting element. Fixing in the clamping position in this case is effected, for example, by tightening of the fastening elements, such that the setting element is held non-positively (also positively, if necessary) on the tool basic body.

In a preferred design, however, the adjusting elements are realized, in particular, as adjusting screws, which are supported on a counter-bearing surface of the setting element. In the case of this design, the setting element is at the same time fixed and held in the respective position by means of the adjusting screw. An additional actuation of the fastening elements is therefore not required, and is also not provided. This enables the setting element to be adjusted in a particularly simple and, at the same time, highly precise manner through actuation of the setting screw. Preferably, at least two setting screws are provided, which are realized and disposed for adjustment of the setting element in opposing directions, i.e. the one setting screw is provided for releasing the clamping elements and the other setting screw is provided for tightening the clamping elements. As an alternative to this, it is possible, in principle, for these functions to be integrated also into one setting screw, which then is a double-action setting screw.

The object is furthermore achieved, according to the invention, by a mounting aid for simultaneous mounting of cutting inserts in the case of such a cutting insert carrier, the mounting aid having a carrier comprising a plurality of pockets for receiving the cutting inserts. The pockets in this case are disposed at positions corresponding to the insert seats, i.e. the carrier has the same basic geometry as the cutting insert carrier, in particular substantially the same diameter, and the distribution of the pockets in the carrier is identical to the distribution of the insert seats in the tool basic body. The number and position of the pockets therefore preferably corresponds to the number and the positions of the insert seats in the tool basic body.

Preferably, the use of two such carriers is provided for such an insert changing system, namely, an empty carrier for receiving the worn cutting inserts from the cutting insert carrier, and a further carrier fitted with new or prepared cutting inserts.

Insert changing in this case is effected as follows:

The empty carrier, is advanced to the tool, i.e. the cutting insert carrier fitted with cutting inserts, such that the pockets are approximately opposite the cutting inserts, and thus approximately opposite the insert seats. Then, in the second step, the common setting element is actuated to release the clamping elements, such that the cutting inserts can be removed from the insert seats. In particular, it is provided in this case that the cutting inserts fall out of the insert seats under only their own weight and are caught by the pockets.

This is particularly simple in the case of tools having the indexable inserts disposed on a front face. Thus, in the case of front face milling cutters, the cutting inserts are aligned approximately perpendicularly in relation to the machining plane, i.e. their base sides or flat sides are aligned at least approximately perpendicularly in relation to the front, and therefore in relation to the machining plane of the face milling cutter. For the purpose of clamping, the clamping elements are applied to a flat side of the indexable cutting insert, and therefore, in the case of such face milling cutters, exert a force in the circumferential direction. Overall, this enables the individual indexable inserts to fall (downward) out of the insert seats, toward the front face, and to be caught by the pockets.

In the next step, the carrier fitted with the new cutting inserts is then advanced to the tool basic body, this being done in such a way that, as it is being advanced, the cutting inserts are at the same time brought into a (pre-)assembly position in the respective insert seats. Finally, in the next step, the adjusting element is actuated in the clamping direction, such that the clamping elements lock the respective cutting inserts in their insert seats. In this case, because of the auto-centering function, described above, resulting from the cup-shaped head of the clamping element acting together with a receiver, corresponding thereto, on the cutting insert, the changeover from the pre-assembly position to the desired clamping position is effected automatically.

"Pockets" of the carrier are understood to be any receiver for the cutting inserts. Basically, this can also be realized by a fork element having elastic fork arms, which hold a respective cutting insert.

The assembly aid with the carrier at the same time defines a tool changing system, in which the carriers, at the same time, are also storage and transport means. Preferably, in this case, the carriers for the worn cutting inserts and the carriers for the new or re-prepared cutting inserts are identified accordingly, for example by differing colors (red/green). The carriers having the worn cutting inserts are brought, in the carrier for preparation, to the manufacturer of the cutting inserts, for example, where—insofar as possible—they are reground or, alternatively, exchanged for new inserts. In the case of indexable cutting inserts, the latter are first indexed and reused. The prepared/new cutting inserts are then provided in the correspondingly identified carrier.

BRIEF DESCRIPTION OF THE DRAWINGS

An exemplary embodiment of the invention is explained more fully in the following with reference to the figures. In figure representations, some of which are schematic and simplified.

In the figures, details that are equivalent are denoted by the same references.

DETAILED DESCRIPTION OF THE INVENTION

Figure 1:
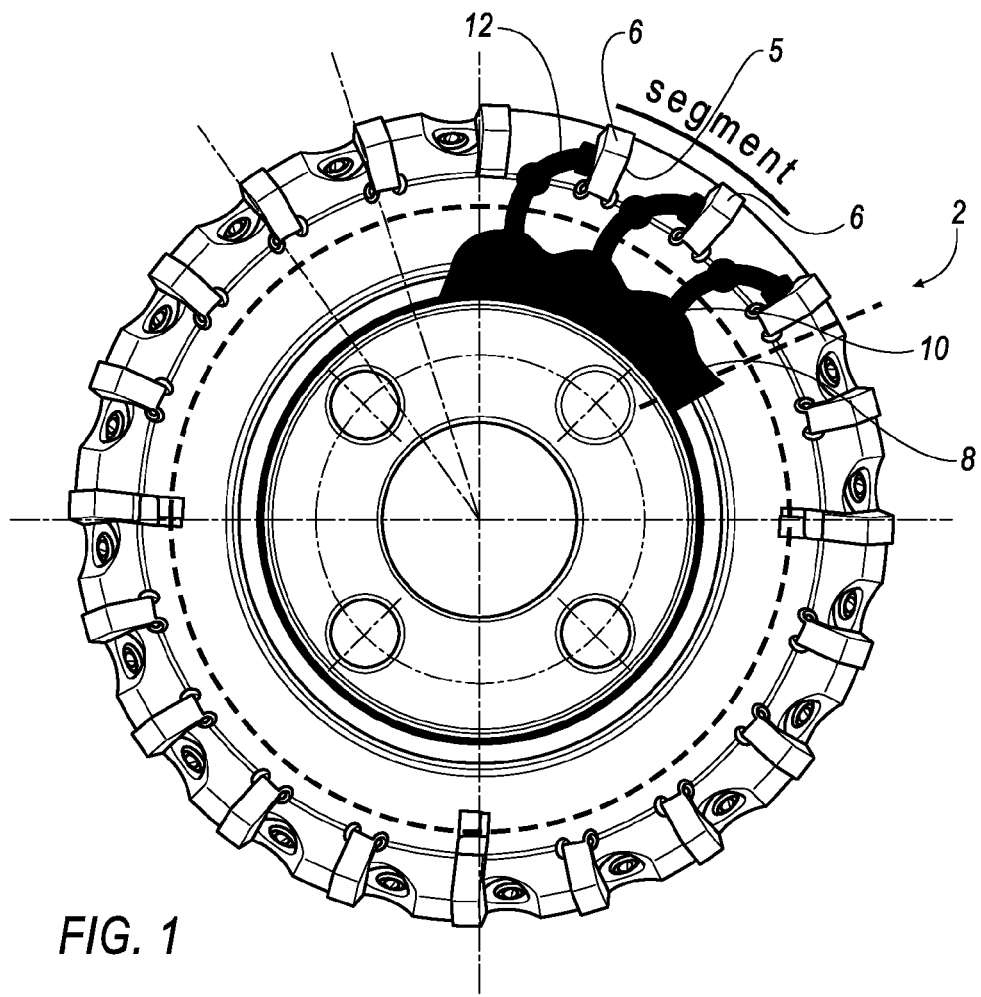
FIG. 1 shows a front view of a front face milling cutter, represented in which is a segment of a setting element, which is realized as a curved ring or curved disk and which comprises a clamping lever.

Represented in the exemplary embodiment, as a blade head, is a front face milling cutter (2), which has a cutting insert carrier, defined by a tool basic body (4), and which has a multiplicity of cutting inserts (6) that are realized, in particular, as indexable cutting inserts and that are each disposed in an insert seat (5) of the cutting insert carrier (4). As can be seen, in particular, from comparison of the representations according to FIG. 1 and FIG. 2, the cutting inserts (6) in this case are disposed around the circumference on the front face of the tool basic body. Provided on the front face is a setting element, realized as a curved disk (8), which is disposed so as to be rotatable relative to the tool basic body (4). On its circumferential side, the curved ring (8) has a multiplicity of cams (10), which constitute a path guide for a constrained guidance for clamping elements (12) realized as clamping levers. As shown, in particular, by FIG. 4, the cams (10) have a special configuration and, in particular, are realized asymmetrically. Thus, they firstly have a first arc portion, which extends increasingly in a radial direction. This arc portion is adjoined at an end by a latching hollow (14), before the cam (10) has a flank that falls away steeply.

The clamping lever (12) in this case is realized as an articulated arm lever having a first lever arm (16A) and a second lever arm (16B). The second lever arm (16B) is guided, via its foot (18), along the cam (10) in a constrained manner. The clamping lever (12) is fastened, in its articulation region, to the tool basic body (4). The articulation region therefore constitutes a rotation axis (20) for the clamping lever (12). On its front side, the first lever arm has a clamping head (22), which is pressed against a flat side of the respective cutting insert (6).

Figure 2:
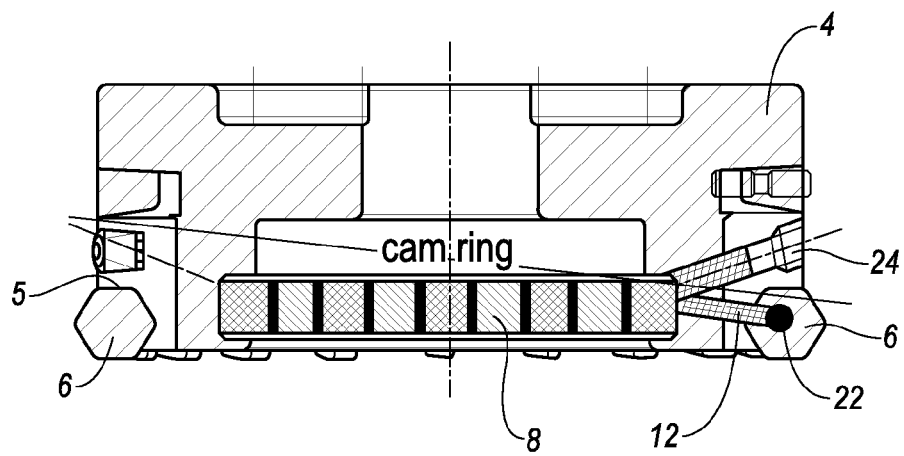
FIG. 2 shows a sectional view through the face milling cutter according to FIG. 1.
Figure 3:
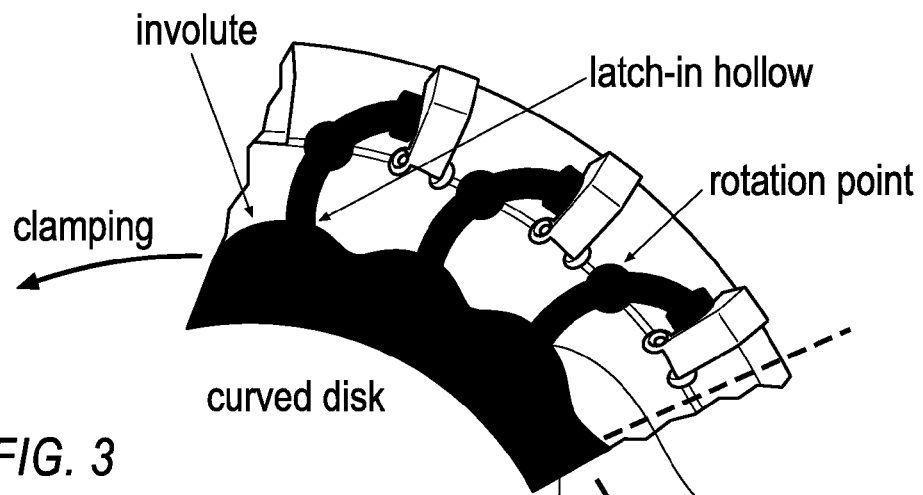
FIG. 3 shows a representation of a segment from the front view according to FIG. 1.

Adjustment of the setting element (8) is effected by means of an adjusting screw (24), which is represented in FIG. 2. This adjusting screw is supported on a corresponding bearing surface of the curved ring (8), such that, upon actuation, the latter exerts a relative rotational movement about the rotation axis of the face milling cutter (2). Preferably, two such adjusting screws (24) are provided, which are disposed with a rotational offset of, for example, 180°, and which exert their adjusting forces in opposing directions of rotation.

Figure 4:
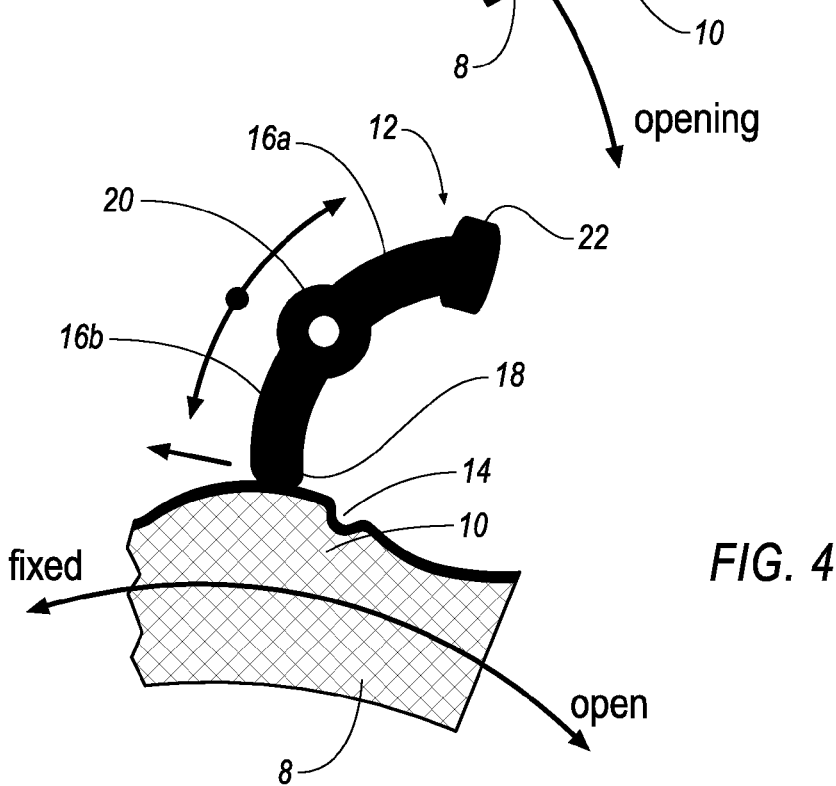
FIG. 4 shows an enlarged representation of the curved ring, with a clamping lever.

Upon actuation by means of the first adjusting screw (24) for clamping the cutting inserts (6), the setting ring (8) in the exemplary embodiment is moved counter-clockwise in the direction "fixed" (FIG. 4). Upon this movement, the cam (10) causes the second lever arm (16B) to be guided in a constrained manner in the direction represented by the arrow in FIG. 4, such that a rotational movement about the rotation axis (20) is effected, and the clamping head (22) moves in the direction (clamping direction) represented by the further arrow and locks the cutting insert (6). Upon attaining the latching hollow (14), the foot (18) latches in the latter, this being made perceptible by an audible click sound and/or through tactile sensing. This click sound indicates to the person performing the setting that the desired clamping position has now been attained.

Release is effected in the reverse direction, i.e. the curved ring (8) is actuated in the opposite direction (direction "open", FIG. 4), by means of the second adjusting screw (24).

Overall, what is crucial is that, by means of the mechanism described here, all clamping levers are actuated simultaneously by means of the setting ring (8), i.e. all are actuated simultaneously, depending on the direction of rotation, in the clamping direction (direction "fixed") or in the release direction (direction "open").

Figure 5:
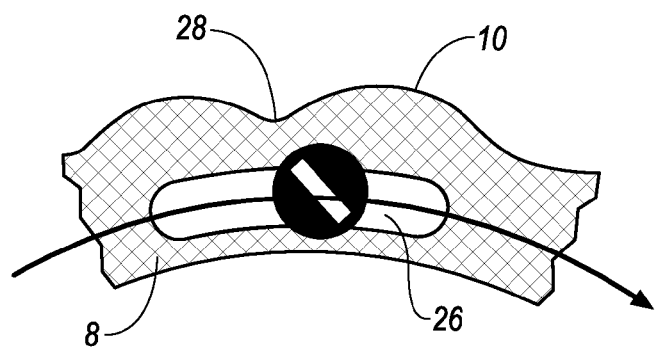
FIG. 5 shows an enlarged representation of a segment of the setting element having a fastening element for fastening to the tool basic body.

In FIG. 5, it can also be seen that the curved ring (8) preferably has a plurality of elongate holes (26), through which the fastening screws (28) are routed for rotatable fastening on the tool basic body (4).

What is claimed is:

1. A cutting insert carrier comprising a tool basic body having a plurality of insert seats distributed around the circumference thereof, a plurality of cutting inserts mounted in a respective insert seat, a setting element provided on the tool basic body, a plurality of clamping elements for clamping/unclamping a respective cutting insert, each clamping element comprising an articulated clamping lever having a first lever arm and a second lever arm, the articulated clamping lever attached to the tool basic body in such a way that the articulated clamping lever rotates about a rotation axis to bring the first lever arm into pressing engagement with the respective cutting insert while second lever arm is guided in a constrained manner on the setting element, and wherein plurality of clamping elements are jointly actuated by the setting element to simultaneously clamp/unclamp the plurality of cutting inserts in the plurality of insert seats.

2. The cutting insert carrier as claimed in claim 1, wherein the setting element is mounted on the tool basic body so as to be adjustable relative to the tool basic body, and the plurality of clamping elements can be actuated by a relative movement of the setting element.

3. The cutting insert carrier as claimed in claim 1, wherein the plurality of clamping elements are guided in a constrained manner on the setting element in such a way that an adjustment movement of the setting element results in an adjustment of the plurality of clamping elements.

4. The cutting insert carrier as claimed in claim 1, wherein the setting element defines a latching position in which the plurality of clamping elements are held in a clamping position.

5. The cutting insert carrier as claimed in claim 4, wherein the setting element defines a dedicated latching position for each clamping element.

6. The cutting insert carrier as claimed in claim 5, wherein the setting element has latching hollows for accommodating a foot of the plurality of clamping elements when in the clamping position.

7. The cutting insert carrier as claimed in claim 1, wherein the plurality of clamping elements have a clamping head, which acts upon the respective cutting insert in such a way that the cutting insert is automatically fixed in a desired position.

8. The cutting insert carrier as claimed in claim 1, wherein the setting element defines a path guide for each clamping element, along which each clamping element is guided in a constrained manner.

9. The cutting insert carrier as claimed in claim 1, wherein the setting element comprises a curved ring having a circumference with cams thereon.

10. The cutting insert carrier as claimed in claim 1, wherein the setting element has a slot.

11. The cutting insert carrier as claimed in claim 9, wherein the setting ring has slotted inner circumferential surface.

12. The cutting insert carrier as claimed in claim 1, wherein the setting element is rotatably mounted on a front face of the tool basic body.

13. The cutting insert carrier as claimed in claim 1, wherein the setting element is disposed around the tool basic body.

14. The cutting insert carrier as claimed in claim 1, wherein the setting element is fastened to the tool basic body by fastening elements, which are routed through elongate holes in the setting element.

15. The cutting insert carrier as claimed in claim 1, further comprising an adjusting element for adjusting the setting element.

16. The cutting insert carrier as claimed in claim 15, wherein two adjusting elements are provided for adjustment of the setting element in opposite directions.

* * * * *